US009969555B1

(12) United States Patent
Prado

(10) Patent No.: US 9,969,555 B1
(45) Date of Patent: May 15, 2018

(54) STAIR-MOUNTED ROLLER WHEEL DEVICE

(71) Applicant: Marlon Prado, Miami, FL (US)

(72) Inventor: Marlon Prado, Miami, FL (US)

( * ) Notice: Subject to any disclaimer, the term of this patent is extended or adjusted under 35 U.S.C. 154(b) by 0 days. days.

(21) Appl. No.: 15/358,255

(22) Filed: Nov. 22, 2016

(51) Int. Cl.
*B65G 13/00* (2006.01)
*B65G 13/11* (2006.01)

(52) U.S. Cl.
CPC ............. *B65G 13/11* (2013.01); *B65G 13/00* (2013.01)

(58) Field of Classification Search
CPC ................................ B65G 13/11; B65G 11/86
USPC .......... 193/35 R, 37; 414/787, 800; 16/18 B, 16/29, 30, 31 R; 52/184
See application file for complete search history.

(56) References Cited

U.S. PATENT DOCUMENTS

| 498,649 | A | 5/1893 | Hallock | |
|---|---|---|---|---|
| 995,300 | A | 6/1911 | Sneed | |
| D184,292 | S | 1/1959 | Scanlon | |
| 4,224,714 | A | 9/1980 | Seipos | |
| 5,158,312 | A | 10/1992 | Lausch | |
| D363,209 | S | 10/1995 | Murphy | |
| 5,655,259 | A | 8/1997 | Look | |
| 8,602,196 | B1 * | 12/2013 | Patel | B62B 5/02 193/35 R |
| 2012/0042472 | A1 * | 2/2012 | Aubin | B60B 33/0015 16/46 |

* cited by examiner

*Primary Examiner* — Gene O Crawford
*Assistant Examiner* — Lester III Rushin

(57) ABSTRACT

The stair-mounted roller wheel device is a device that is adapted for use with at least one stair. Moreover, the stair-mounted roller wheel device is adapted to be positioned onto a stair tread as well as a riser surface of the at least one stair. The stair-mounted roller wheel device includes a base that rests on the stair tread as well as the riser. A roller member is rotatably engaged at a top, front corner of the base. The roller member is adapted to be parallel with the stair tread and the riser. Ideally, in a situation where a plurality of stairs of a staircase is provided, a plurality of the stair-mounted roller wheel devices would be positioned on each of the plurality of stairs such that the object is adapted to be rolled up or down the staircase.

2 Claims, 4 Drawing Sheets

STAIR-MOUNTED ROLLER WHEEL DEVICE

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of roller dollies, more specifically, a roller wheel device that is adapted to work with a stair in order for an object to roll up or down said stair.

SUMMARY OF INVENTION

The stair-mounted roller wheel device is a device that is adapted for use with at least one stair. Moreover, the stair-mounted roller wheel device is adapted to be positioned onto a stair tread as well as a riser surface of the at least one stair. The stair-mounted roller wheel device includes a base that rests on the stair tread as well as the riser. A roller member is rotatably engaged at a top, front corner of the base. The roller member is adapted to be parallel with the stair tread and the riser. Moreover, the roller member is adapted to enable an object to be rolled up or down said at least one stair. Optionally, the roller member is able to rotate with respect to the base. Ideally, in a situation where a plurality of stairs of a staircase is provided, a plurality of the stair-mounted roller wheel devices would be positioned on each of the plurality of stairs such that the object is adapted to be rolled up or down the staircase.

These together with additional objects, features and advantages of the stair-mounted roller wheel device will be readily apparent to those of ordinary skill in the art upon reading the following detailed description of the presently preferred, but nonetheless illustrative, embodiments when taken in conjunction with the accompanying drawings.

In this respect, before explaining the current embodiments of the stair-mounted roller wheel device in detail, it is to be understood that the stair-mounted roller wheel device is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the stair-mounted roller wheel device.

It is therefore important that the claims be regarded as including such equivalent construction insofar as they do not depart from the spirit and scope of the stair-mounted roller wheel device. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
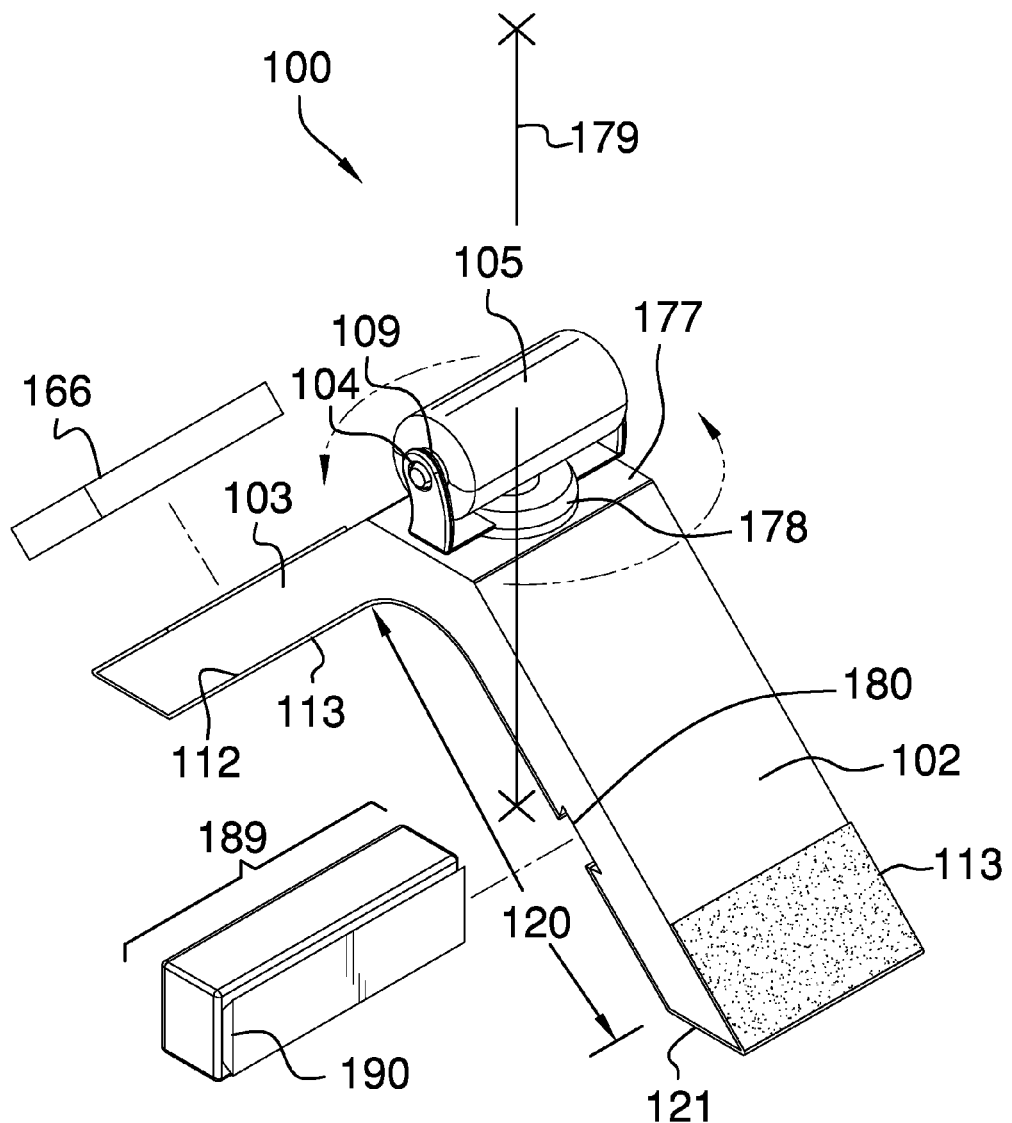
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to one or more potential embodiments of the disclosure, which are illustrated in FIGS. 1 through 5.

The stair-mounted roller wheel device 100 (hereinafter invention) comprises a base 101 that is further defined with a vertical armature 102 and a horizontal armature 103. The vertical armature 102 is affixed to and perpendicularly-oriented with respect to the horizontal armature 103.

The base 101 is further defined with a pair of roller armatures 104. The pair of roller armatures 104 extend away from both the vertical armature 102 as well as the horizontal armature 103. The pair of roller armatures 104 face one another, and support a roller member 105 there between.

The pair of roller armatures 104 is affixed to a rotating base member 178. The rotating base member 178 is essentially a bearing that enables the pair of roller armatures 104 to rotate about a vertical axis 179. The roller member 105 and the pair of roller armatures 104 collectively rotate with respect to the vertical axis 179 as needed.

Figure 4:
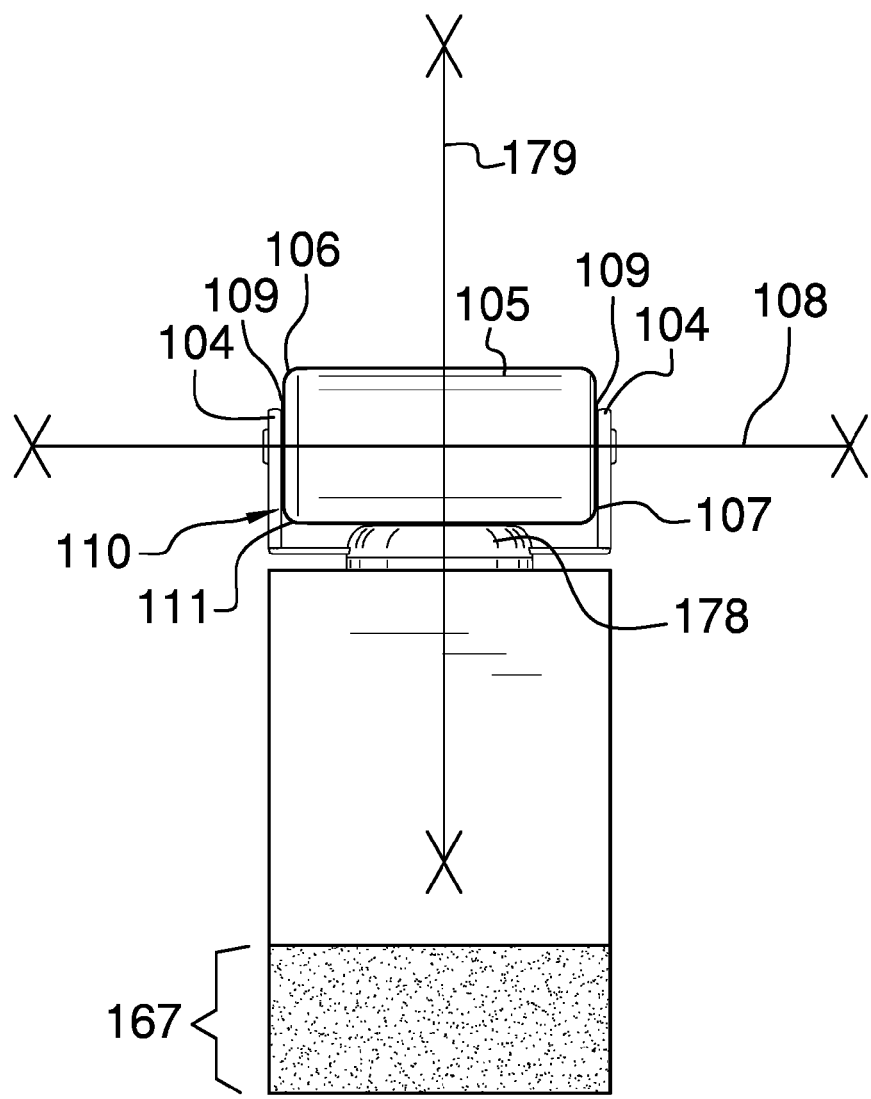
FIG. 4 is a front view of an embodiment of the disclosure.

The base 101 spans across a first end 106 and a second end 107 of the roller member 105. Referring to FIG. 4, the roller member 105 is sandwiched between the pair of roller armatures 104.

The roller member 105 rolls along a horizontal axis 108. The horizontal axis 108 passes across the first end 106 and the second end 107. The roller member 105 is able to rotate with respect to the horizontal axis 108 via bearing members 109 provided at the first end 106 and the second end 107.

Referring to FIG. 4, the pair of roller armatures 104 extend upwardly from the vertical armature 102 as well as the horizontal armature 103 in order to provide clearance for the roller member 105. A third surface 177 is formed where the vertical armature 102 and the horizontal armature 103 meet. The third surface 177 enables the pair of roller armatures 104 to attach thereon.

The vertical armature 102 and the horizontal armature 103 is further defined with an inner surface 112. The inner surface 112 is adapted to interface with a stair tread 201 or a stair riser 202. The inner surface 112 may include a surface interface member 113. The surface interface member 113 is a glorified term for a strip of rubber, foam, or other material that will grip the stair tread 201 or the stair riser 202, but not scratch or damage said surface.

The vertical armature 102 and the horizontal armature 103 is further defined with an armature length 120. The armature length 120 is less than a stair depth 210 or a stair height 211. More specifically, the inner surface 112 defines the armature length 120. The vertical armature 102 and the horizontal armature 103 may include a tapered end 121. The tapered end 121 is a bevel cut that enables the frame 101 to lie flat on a ground surface 500 when not in use.

The vertical armature 102 and the horizontal armature 102 may be further defined with an outer surface 110. The outer surface 110 is opposite of the inner surface 112. The tapered end 121 may be covered with the surface interface member 113. A portion 167 of the outer surface 110 may be covered with the surface interface member 113.

Figure 2:
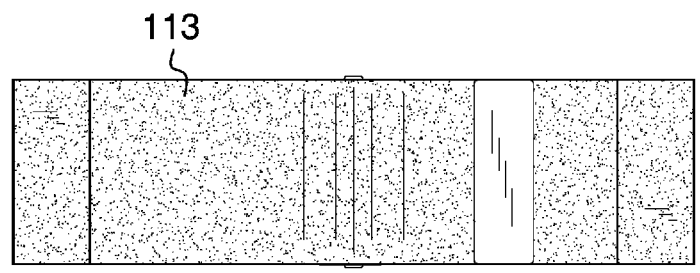
FIG. 2 is a bottom view of an embodiment of the disclosure.
Figure 3:
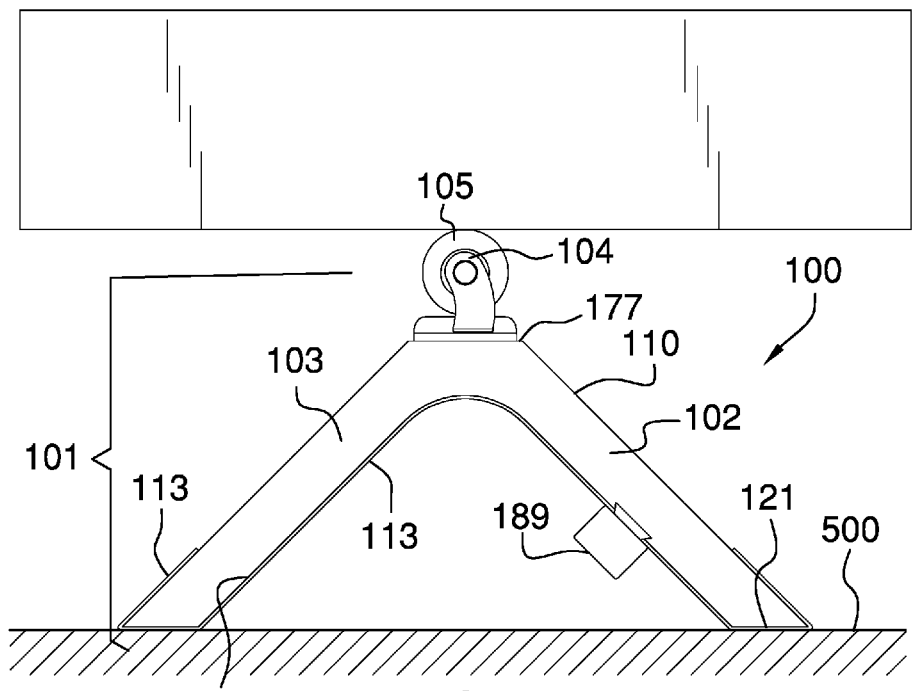
FIG. 3 is a side view of an embodiment of the disclosure.

Referring to FIGS. 1-3, the inner surface 112 may include a notch 180. More specifically, the notch 180 is provided on the vertical armature 102, and not the horizontal armature 103. The notch 180 enables an undercut support 189 to attach thereto. The undercut support 189 is optionally used to provide enhanced support of the invention 100 with respect to a stair lip 277. The stair lip 277 exists where the stair tread 201 extends over the stair riser 202. The undercut support 189 includes a notch member 190 that slides into the notch 180 in order to selectively secure the undercut support 189 to the inner surface 112 of the vertical armature 102.

The invention 100 may require the use of a weighted member 166. The weighted member 166 is secured onto the outer surface 110 of the horizontal armature 103. The weighted member 166 is ideally positioned adjacent to the tapered end of the horizontal armature 103 in order to counter an unbalanced weight distribution attributed to the undercut support 189.

Figure 5:
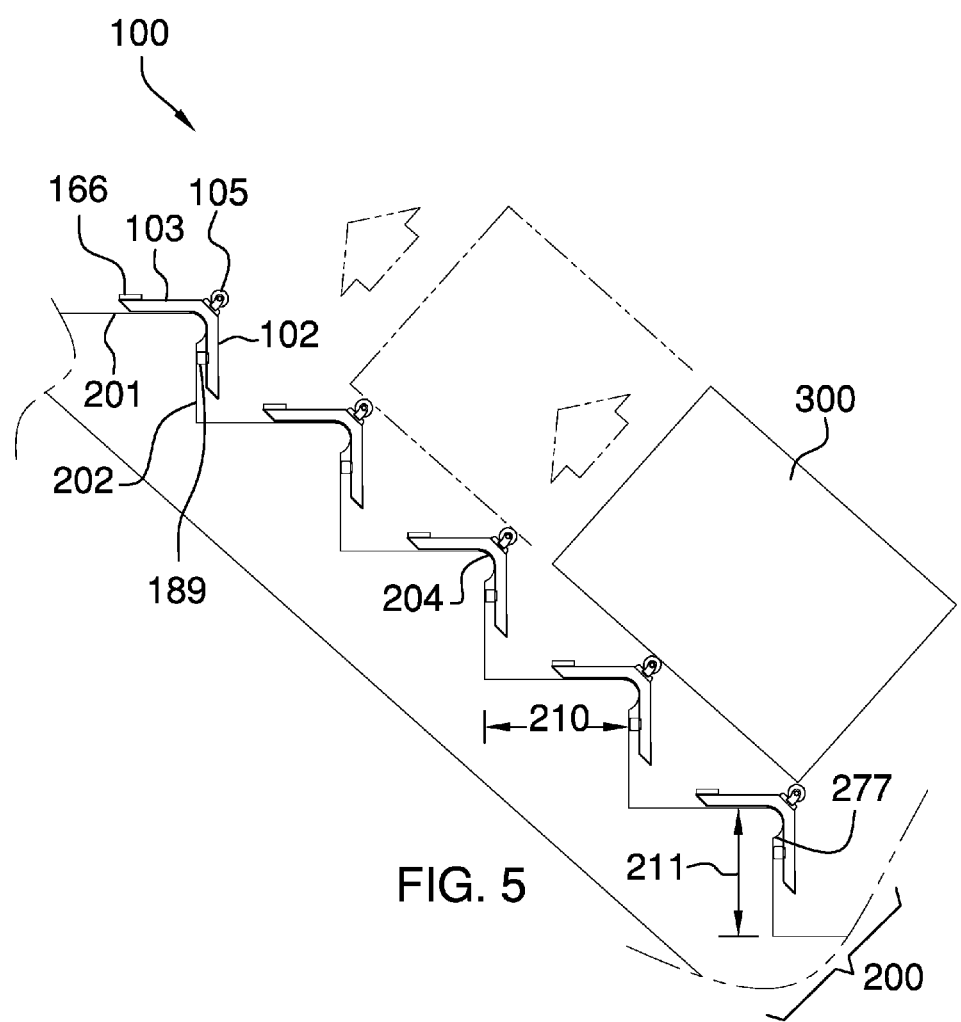
FIG. 5 is an in-use view of an embodiment of the disclosure.

Referring to FIG. 5, the invention 100 is ideally suited for use with all stairs of a staircase 200. In fact, each step 203 is provided with the invention 100. The roller member 105 is parallel with a stair edge 204. Moreover, an object 300 is adapted to be pushed up or down the staircase 200 via the roller member 105 of the invention 100.

The frame 101 and the roller member 105 are ideally made of a material comprising a plastic, a metal, a carbon fiber composite, or a wood.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A roller wheel device comprising:
a base adapted to be positioned on a stair;
wherein the base includes a roller member;
wherein the roller member is generally parallel with said stair;
wherein the roller member is adapted to enable an object to be pushed up or down said stair;
wherein the base is further defined with a vertical armature and a horizontal armature;
wherein the vertical armature is affixed to and perpendicularly-oriented with respect to the horizontal armature;
wherein the base is further defined with a pair of roller armatures;
wherein the pair of roller armatures extend away from both the vertical armature as well as the horizontal armature;
wherein the pair of roller armatures face one another, and support the roller member there between;
wherein the base spans across a first end and a second end of the roller member;
wherein the roller member is sandwiched between the pair of roller armatures;
wherein the roller member rolls along a horizontal axis;
wherein the horizontal axis passes across the first end and the second end;
wherein the roller member is able to rotate with respect to the horizontal axis via bearing members provided at the first end and the second end;
wherein the pair of roller armatures is affixed to a rotating base member;
wherein the rotating base member is a bearing that enables the pair of roller armatures to rotate about a vertical axis;
wherein the roller member and the pair of roller armatures collectively rotate with respect to the vertical axis as needed;
wherein the pair of roller armatures extend upwardly from the vertical armature as well as the horizontal armature in order to provide clearance for the roller member;
wherein a third surface is formed where the vertical armature and the horizontal armature meet;
wherein the third surface enables the pair of roller armatures to attach thereon;
wherein the vertical armature and the horizontal armature is further defined with an inner surface;
wherein the inner surface is adapted to interface with a stair tread or a stair riser;
wherein the inner surface includes a surface interface member;
wherein the surface interface member is configured to engage the stair tread or the stair riser;
wherein the vertical armature and the horizontal armature is further defined with an armature length;
wherein the armature length is less than a stair depth of the stair tread or a stair height of the stair riser;
wherein the inner surface defines the armature length;
wherein the vertical armature and the horizontal armature are each further defined with a tapered end;

wherein the tapered end is a bevel cut that enables a frame to lie flat on a ground surface when not in use;

wherein the vertical armature and the horizontal armature are further defined with an outer surface;

wherein the outer surface interfaces with the third surface;

wherein the outer surface is opposite of the inner surface;

wherein the tapered end is covered with the surface interface member;

wherein a portion of the outer surface is covered with the surface interface member;

wherein the inner surface includes a notch; wherein the notch is provided on the vertical armature, and not the horizontal armature;

wherein the notch enables an undercut support to attach thereto;

wherein the undercut support provides enhanced support of the roller wheel device with respect to a stair lip;

wherein the stair lip is formed where the stair tread extends over the stair riser;

wherein the undercut support includes a notch member that slides into the notch in order to selectively secure the undercut support to the inner surface of the vertical armature.

2. The roller wheel device according to claim 1 wherein a weighted member is secured onto the outer surface of the horizontal armature; wherein the weighted member is positioned adjacent to the tapered end of the horizontal armature in order to counter an weight distribution attributed to the undercut support; wherein the roller member is parallel with a stair edge formed with the stair tread and the stair lip.

* * * * *